United States Patent [19]
Kanomata

[11] 3,933,174
[45] Jan. 20, 1976

[54] VALVE WITH A PULSATION DAMPING DEVICE

[75] Inventor: Kunihiko Kanomata, Aikawa, Japan

[73] Assignee: Sanko Engineering & Construction Co., Ltd., Yokohama, Japan

[22] Filed: May 20, 1974

[21] Appl. No.: 471,576

[52] U.S. Cl. ............ 137/557; 137/614.18; 251/205
[51] Int. Cl.² .................... F16K 37/00; F16K 31/50
[58] Field of Search............... 137/557, 596, 614.18; 251/205, 346, 351

[56] References Cited
UNITED STATES PATENTS

| | | | |
|---|---|---|---|
| 452,535 | 5/1891 | Winkler | 251/DIG. 4 |
| 604,659 | 5/1898 | Fournier | 251/346 X |
| 1,555,013 | 9/1925 | Kraft | 251/351 X |
| 3,272,230 | 9/1966 | Bolling | 137/557 |
| 3,583,427 | 6/1971 | Taulier | 137/557 X |
| 3,825,224 | 7/1974 | Remane | 251/205 |

Primary Examiner—Henry T. Klinksiek
Attorney, Agent, or Firm—Edward J. Brenner

[57] ABSTRACT

A novel valve with a pulsation damping device is provided. The valve comprises a truncated valve stem and a cylinder for damping pulsation which, unified with the truncated valve stem, is movable longitudinally through a cylindrical hole formed beneath a valve seat corresponding to the truncated valve stem. This valve is useful as a multipurpose valve when inserted to a pipe connecting a fluid pressure generating apparatus as a reciprocating pump with a pressure gauge, because it can damp pulsation caused by the fluid pressure generating apparatus and regulate the pressure gauge and also attach and detach the pressure gauge to the pipe.

1 Claim, 5 Drawing Figures

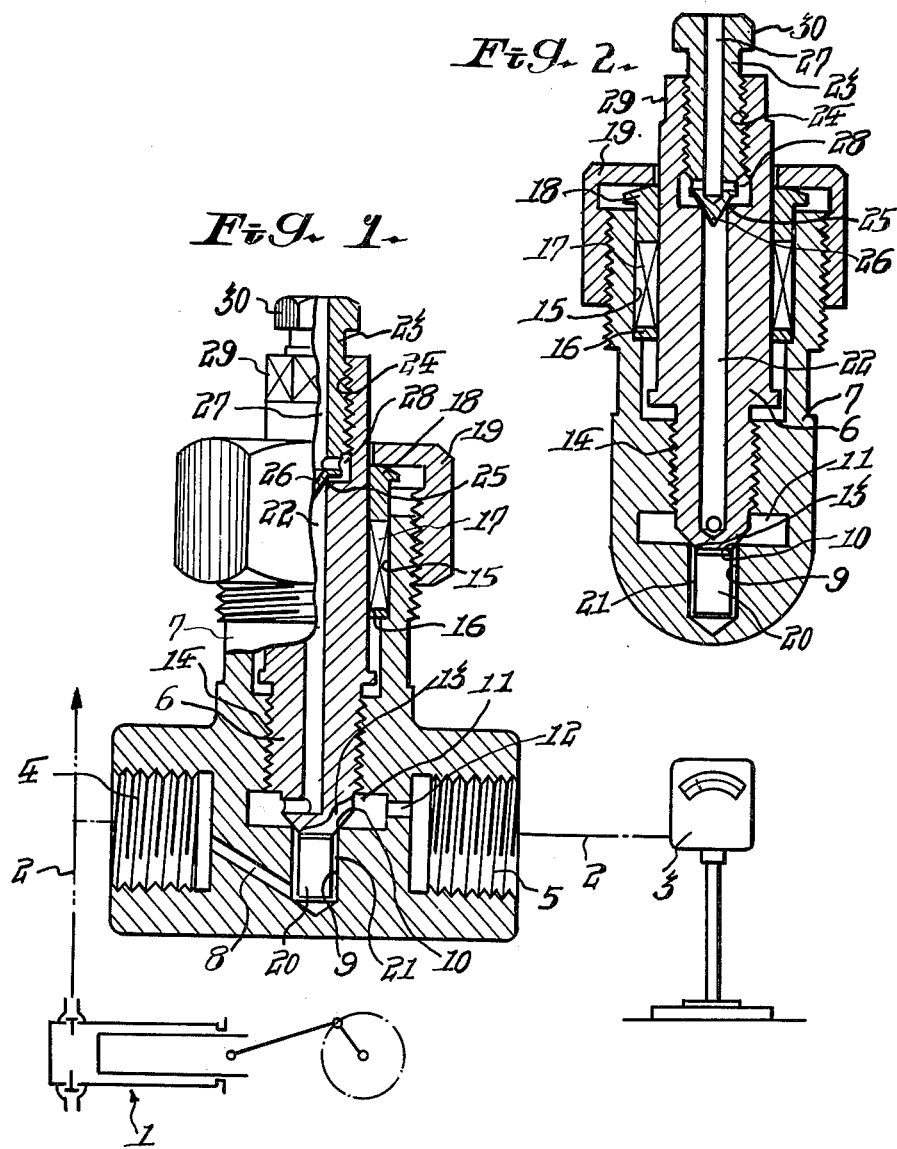

VALVE WITH A PULSATION DAMPING DEVICE

THE BACKGROUND OF THE INVENTION

This invention relates to a novel valve with a pulsation damping device.

In case, in which an end-closed measuring instrument such as a pressure gauge is connected with a fluid pressure generating apparatus as a reciprocating pump by means of a pipe for measuring the pressure thereof, the needle of the measuring instrument fluctuates owing to the pulsation caused by the reciprocating pump, making the measurement of the pressure difficult and the measuring instrument easily broken down.

In order to prevent such influence of the pulsation on the measuring instrument as shown by said fluctuation of the needle thereof, generally a pulsation damping apparatus is inserted to the pipe.

Such conventional pulsation damping apparatus are provided with a valve stem having a needle-like valve part and damp pulsation by adjusting the gap between the valve part and the corresponding valve seat. In such a mechanism, the change of the throttle resistance of the gap with the rotation of the valve stem is shown to be curved in characteristics. Therefore, as will be described below, it is impossible to damp the pulsation effectively by using said conventional pulsation damping apparatus.

This invention has been devised to overcome the defects of the conventional pulsation damping apparatus as described hereinabove.

BRIEF SUMMARY OF THE INVENTION

A primary object of this invention is to provide a valve with a pulsation damping device which can damp the pulsation caused by a fluid pressure generating apparatus.

Another object of this invention is to provide a valve with a pulsation damping device which can regulate a pressure gauge.

A further object of this invention is to provide a valve with a pulsation damping device which can attach and detach a pressure gauge.

According to this invention, there is provided a valve with a pulsation damping device comprising a valve body 7 formed in T-form, said valve body 7 containing a first opening 4 coupled with a pulsating fluid, a second opening 5 coupled with a pressure gauge 3 and a truncated valve stem 6 opening and closing a connection between the first opening 4 and the second opening 5, a valve seat 10 formed in the valve body 7, said valve seat 10 being opened and closed by said truncated valve stem 6, a cylindrical hole 9 formed beneath said valve seat 10 in the valve body 7, the lower end of said cylindrical hole 9 being connected to the first opening 4, a small chamber 11 formed above said cylindrical hole 9 in the valve body 7, said small chamber 11 being connected to the second opening 5, a main exhaust hole 22 formed through said truncated valve stem 6, one end of said main exhaust hole 22 being opened in said small chamber 11, a valve seat 25 and a small chamber 28 both formed at another end of said main exhaust hole 22 in the truncated valve stem 6, a tapped hole 24 for a vent screw 23 formed through said truncated valve stem 6 above the valve seat 25 and the small chamber 28, an auxiliary exhaust hole 27 formed through the vent screw 23 screwed in the tapped hole 24, one end of said auxiliary exhaust hole 27 being opened in the air and another end thereof opened in the small chamber 28, and a cylinder 20 for damping pulsation formed in the cylindrical hole 9 at the lower end of said valve stem 6, said cylinder 20 being unified with said truncated valve stem 6 and being movable in the longitudinal direction of said cylindrical hole 9 so as to have the resistance thereof proportional to the distance of the movement in the longitudinal direction of said cylinder 20.

The above objects and novel features of the invention will be more fully appear from the following detailed description and the accompanying drawing. It is to be expressly understood, however, that the drawing is for purpose of illustration only and is not intended as a definition of the limits of the invention.

BRIEF DESCRIPTION OF THE ACCOMPANYING DRAWING

FIG. 1 is an elevational view partly in vertical section of a preferred embodiment of this invention, illustrating schematically the piping mechanism thereof.

FIG. 2 is a side vertical section of the embodiment of FIG. 1.

Figure 3:
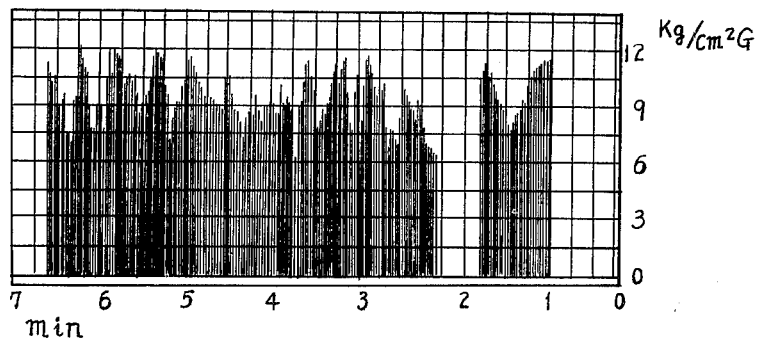
FIG. 3 shows the relation between time and pulsating pressure in a case in which a valve without pulsation damping device is used.
Figure 4:
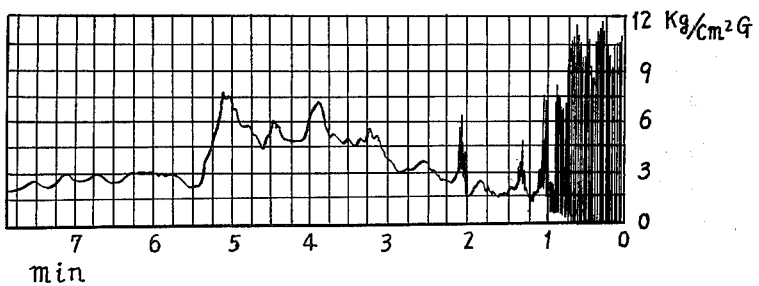
FIG. 4 shows the relation between time and pulsating pressure in a case in which a valve with a needle-type pulsation damping device is used.
Figure 5:
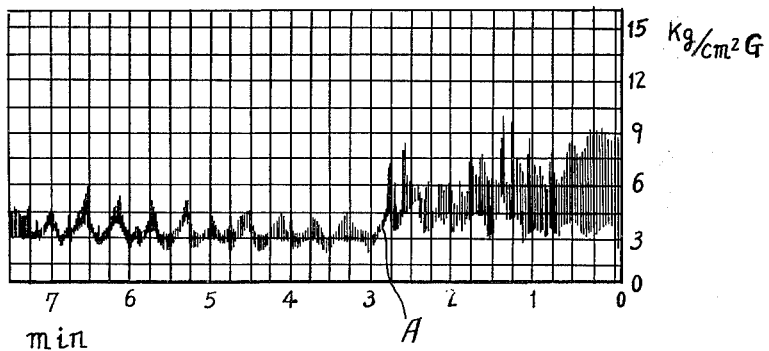
FIG. 5 shows the relation between time and pulsating pressure in a case in which the valve with a pulsation damping device of this invention is used.

The results of FIG. 3, FIG. 4 and FIG. 5 are measured by means of a pressure load measuring instrument using one cylinder-plunger pump (output pressure characteristic: pulsation frequency 64/min, max. amplitude of pulsation $12kg/cm^2G$, min. amplitude of pulsation $0kg/cm^2G$, kerosene as fluid). In FIG. 3, FIG. 4 and FIG. 5, time is plotted as abscissa and pulsating pressure plotted as ordinate.

DETAILED DESCRIPTION OF THE INVENTION

Referring to FIG. 1 and FIG. 2, a valve body 7 is formed in inverse T-form, which comprises a first opening coupled with a pulsating fluid, second opening 5 coupled with a pressure gauge 3 and a valve stem 6 opening and closing a connection between the first opening 4 and the second opening 5. The valve body 7 may also be formed in T-form or in lateral T-form.

In order to connect the first opening 4 with the second opening 5, a first connecting hole 8, a right cylindrical hole 9, a valve seat 10, a small chamber 11 and a second connecting hole 12 are formed successively from the first opening 4 to the second opening 5 in the valve body 7.

In order to carry out said opening and closing in engagement with said valve seat 10, the lower end part of the valve stem 6 is formed to be a truncated conical valve part 13. This truncated valve stem 6 is screwed into the valve body 7 movably through a regulating screw 14.

The conventional pulsation damping apparatus which are provided with valve stems having a needle-like valve part instead of said truncated conical valve part 13 and damp pulsation by regulating the gap between the valve part and the corresponding valve seat, have such defects as will be described below, thus making a correct measurement of the pressure impossible.

According to this invention, a right circular cylinder 20 for damping pulsation is provided at the lower end of the truncated conical valve part 13 of the valve stem 6, forming a gap passage 21 having a variable length between said cylinder 20 and said cylindrical hole 9.

The valve of this invention is constructed to be unified with a pulsation damping device. Namely, at the upper part of the valve body 7 is provided a packing hole 15, therethrough said valve stem 6 is made to pass upwards. A washer 16 and a packing 17 are inserted into the packing hole 15 and are pressed by a gland 18 and a gland nut 19, thus making a sealing device formed between the valve stem 6 and the valve body 7.

A main exhaust hole 22 is provided through the whole valve stem 6, the lower opening thereof being opened in said small chamber 11 and the upper opening thereof opened at the bottom center of a tapped hole 24 for vent screw 23, thus forming a valve seat 25.

The lower end part of said vent screw 23 is made to be conical to form a valve part 26 which performs a valve action cooperatively with the valve seat 25. An auxiliary exhaust hole 27 is provided through the whole vent screw 23, the upper end thereof being opened to the air and the lower end thereof opened in the small chamber 28 at the lower end of the tapped hole 24.

At the upper ends of the valve stem 6 and the vent screw 23 are formed respectively many-sided heads 29 and 30 which are both capable of engaging with a rotating tool (not shown).

Therefore, in case in which it is necessary to remove the pressure gauge 3 from the pipe 2 owing to the faults thereof and the like or to carry out zero regulation of the gauge 3 in keeping it attached to the pipe 2, the measurement is stopped temporarily. Namely, the valve stem 6 is rotated to the closing direction by applying the tool to the many-sided head 29 thereof so as to have the valve part 13 engaged with the valve seat 10. Thus, the first connecting hole 8 is blocked to the small chamber 11.

Next, when the upper end of the main exhaust hole 22 is connected to the open air through the auxiliary exhaust hole 27 by rotating the vent screw 23, the fluid to be measured existing in the pressure gauge 3 passes through the second connecting hole 12, the small chamber 11 and the main exhaust hole 22 to be exhausted into the air, and then the gauge pressure becomes zero. And if necessary, the pressure gauge 3 may be removed from the pipe 2.

In case, in which the first connecting hole 8 is connected with the second connecting hole 12 through the small chamber 11 and the fluid pressure generated in the pressure generating apparatus 1 is measured by means of the gauge 3, the valve part 13 is separated from the valve seat 10 by closing the vent screw 23 and rotating the valve stem 6 by applying the rotating tool to the many-sided head 29 thereof, thereby the fluid to be measured can reach the pressure gauge 3, passing through the first connecting hole 8, the variable gap passage 21, the small chamber 11, the second connecting hole 12 and the pipe 2, thus enabling the fluid pressure generated in the apparatus 1 to be measured.

Now, in case in which the pressure generating apparatus 1 happens to be a reciprocating pump which generates a pulsating pressure, it is required to damp the pulsation thereof. In the conventional pulsation damping apparatus, however, which are provided with valve stems having a needle-like valve part and damp the pulsation by regulating the variable gap between the valve part and the corresponding valve seat, the change of the throttle resistance of the gap with the rotation of the valve stem is shown to be curved in characteristics. For example, in case in which the needle of the pressure gauge fluctuates between $8kg/cm^2G$ at minimum and $12kg/cm^2G$ at maximum owing to the pulsation, the gauge indication is adjusted to be $10kg/cm^2G$ by regulating said gap in order to prevent the pulsation.

However, even when the wave form of the pressure is averaged by means of the conventional needle valve and the gauge indication is adjusted to be $10kg/cm^2G$ in order to damp the pulsation, the needle of the gauge is observed to approach to $12kg/cm^2G$ or $8kg/cm^2G$ of the gauge indication. Namely, in case in which the pulsation is suspended at the level higher than $10kg/cm^2G$, a standard level, the needle has a tendency to deviate toward $12kg/cm^2G$, and in case in which the pulsation is suspended at the level lower than $10kg/cm^2G$, the needle tends to deviate toward $8kg/cm^2G$ conversely.

In the valve of this invention, the sectional area rectangular to the axis of said gap passage 21 is always definite and the throttle resistance in the case of the pulsation damping is set up by the longitudinal length of the part of the cylinder 20 engaged with the cylindrical hole 9. Therefore, the change of the throttle resistance of the gap passage 21 with the vertical movement of the valve stem 6 is shown to be linear in characteristics.

In FIG. 5, the right part shows the pulsating pressure being regulated. The oblique line A indicates the linear characteristic of the pulsation damping device of this invention, which means that the pulsating pressure can be regulated easily. The left part shows the pulsating pressure excellently damped.

Consequently, according to the valve of this invention, it is easily possible to regulate the pulsation damping. Namely, once the gauge indication is adjusted to a fixed value, for example, $3kg/cm^2G$ in FIG. 5, the needle of the gauge does not show such a deviation from the fixed value as shown in the case of the needle valve of FIG. 4 and indicates a pressure close to an effective value of the output pressure of the reciprocating pump.

Moreover, when the fluid to be measured which passes through the gap passage 21 is made to enter into the small chamber 11, it reaches the pressure gauge 3 through the pipe 2, resulting in an assistance of the pulsation damping of the gap passage 21.

The valve of this invention, as described thereinabove, is useful as a multipurpose valve which can attach, detach and regulate the pressure gauge and at the same time can damp pulsation, with the results of simple piping mechanism and easy operation, therefore it is industrially of great valve.

What is claimed is:

1. A valve with a pulsation damping device comprising a valve body (7) formed in T-form, said valve body (7) containing a first opening (4) coupled with a pulsating fluid, a second opening (5) coupled with a pressure gauge (3) and a truncated valve stem (6) opening and closing a connection between the first opening (4) and the second opening (5), a valve seat (10) formed in the valve body (7), said valve seat (10) being opened and closed by said truncated valve stem (6), a cylindrical hole (9) formed beneath said valve seat (10) in the valve body (7), the lower end of said cylindrical hole (9), being connected to the first opening (4), a small chamber (11) formed above said cylindrical hole (9) in the valve body (7), said small chamber (11) being connected to the second opening (5), a main exhaust hole (22) formed through said truncated valve stem (6), on end of said main exhaust hole (22) being opened in said small chamber (11), a valve seat (25) and a small chamber (28) both formed at another end of said main exhaust hole (22) in the truncated valve stem (6), a tapped hole (24) for a vent screw (23) formed through said truncated valve stem (6) above the valve seat (25) and the small chamber (28), an auxiliary exhaust hole (27) formed through the vent screw (23) screwed in the tapped hole (24), one end of said auxiliary exhaust hole (27) being opened in the air and another end thereof opened in the small chamber (28), and a cylinder (20) for damping pulsation formed in the cylindrical hole (9) at the lower end of said valve stem (6), said cylinder (20) being unified with said truncated valve stem (6) and being movable in the longitudinal direction of said cylindrical hole (9) so as to have the resistance thereof proportional to the distance of the movement in the longitudinal direction of said cylinder (20).

* * * * *